(12) United States Patent
McGrath et al.

(10) Patent No.: US 7,603,550 B2
(45) Date of Patent: Oct. 13, 2009

(54) COMPUTER SYSTEM INCLUDING A SECURE EXECUTION MODE-CAPABLE CPU AND A SECURITY SERVICES PROCESSOR CONNECTED VIA A SECURE COMMUNICATION PATH

(75) Inventors: Kevin J. McGrath, Los Gatos, CA (US); Geoffrey S. Strongin, Austin, TX (US); Dale E. Gulick, Austin, TX (US); William A. Hughes, Burlingame, CA (US); David S. Christie, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 1271 days.

(21) Appl. No.: 10/419,082

(22) Filed: Apr. 18, 2003

(65) Prior Publication Data

US 2004/0210760 A1  Oct. 21, 2004

Related U.S. Application Data

(60) Provisional application No. 60/373,571, filed on Apr. 18, 2002.

(51) Int. Cl.
*H04L 9/00* (2006.01)
*H04L 9/32* (2006.01)
(52) U.S. Cl. ..................... 713/164; 713/190
(58) Field of Classification Search ............... 713/164
See application file for complete search history.

(56) References Cited

U.S. PATENT DOCUMENTS 5,615,263 A * 3/1997 Takahashi .................. 713/164

(Continued)

FOREIGN PATENT DOCUMENTS

EP  0849657  11/1997

(Continued)

OTHER PUBLICATIONS

Advanced Micro Devices Inc., "HyperTransport Technology I/O Link—A High-Bandwidth I/O Architecture", Jul. 20, 2001, #25012A, p. 5-6 and 13-17.*

(Continued)

*Primary Examiner*—Gilberto Barron, Jr.
*Assistant Examiner*—Devin Almeida
(74) *Attorney, Agent, or Firm*—Meyertons, Hood, Kivlin, Kowert & Goetzel, P.C.; Stephen J. Curran

(57) ABSTRACT

A computer system includes a processor which may initialize a secure execution mode by executing a security initialization instruction. Further, the processor may operate in the secure execution mode by executing a secure operating system code segment. The computer system also includes an input/output (I/O) interface coupled to the processor via an I/O link. The I/O interface may receive transactions performed as a result of the execution of the security initialization instruction. The transactions include at least a portion of the secure operating system code segment. The I/O interface may also determine whether the processor is a source of the transactions. The computer system further includes a security services processor coupled to the I/O interface via a peripheral bus. The I/O interface may convey the transactions to the security services processor dependent upon determining that the processor is the source of the transactions.

24 Claims, 8 Drawing Sheets

U.S. PATENT DOCUMENTS

| | | | |
|---|---|---|---|
| 5,937,063 A * | 8/1999 | Davis | 713/187 |
| 5,987,604 A | 11/1999 | Edrich | |
| 6,327,652 B1 | 12/2001 | England et al. | |
| 6,330,670 B1 | 12/2001 | England et al. | |
| 6,507,904 B1 | 1/2003 | Ellison et al. | |
| 6,854,046 B1 | 2/2005 | Evans et al. | |
| 7,003,607 B1 * | 2/2006 | Gulick | 710/110 |
| 7,069,442 B2 * | 6/2006 | Sutton et al. | 713/179 |
| 2002/0002673 A1 | 1/2002 | Narin | |
| 2002/0007456 A1 | 1/2002 | Peinado et al. | |
| 2002/0066039 A1 * | 5/2002 | Dent | 713/202 |
| 2003/0200402 A1 | 10/2003 | Willman et al. | |
| 2003/0200405 A1 | 10/2003 | Willman et al. | |

FOREIGN PATENT DOCUMENTS

| | | |
|---|---|---|
| EP | 1 209 563 A2 | 11/2001 |
| WO | 01/75565 | 10/2001 |

OTHER PUBLICATIONS

Advance Micro Devices, Inc., "HyperTransportTM I/O Link Specification," Rev. 1.03, Oct. 10, 2001.*

Advance Micro Devices, Inc., "HyperTransportTM Technology I/O Link: A High-Bandwidth I/O Architecture," Jul. 20, 2001.*

International search report application No. PCT/US03/12659 mailed Jun. 24, 2004.

Ted Doty: "A Firewall Overview", Jul. 1, 1995, Connexions, XX, XX, pp. 20-23, XP000564023, ISSN: 0894-5926.

* cited by examiner

| Bit-Time | 7 | 6 | 5 | 4 | 3 | 2 | 1 | 0 |
|---|---|---|---|---|---|---|---|---|
| 0 | SeqIdSeqID[3:2] | | | Cmd[5:0] = 0011X0b* | | | | |
| 1 | PassPW = 0b | SeqID[1:0] | | UnitID[4:0] = 00000b | | | | |
| 2 | Mask/Count[1:0] = 0Xb* | | Compat = 0b | SrcTag[4:0]/Rsv | | | Mask/Count[3:2] = 00b | |
| 3 | Addr[7:2] = 000001b | | | | | | | |
| 4 | Addr[15:8] = 00h | | | | | | | |
| 5 | Addr[23:16] = 28h | | | | | | | |
| 6 | Addr[31:24] = F9h | | | | | | | |
| 7 | Addr[39:32] = FDh | | | | | | | |

Hash_Data Packet 800 (Sized Write Request)

*FIG. 8*

COMPUTER SYSTEM INCLUDING A SECURE EXECUTION MODE-CAPABLE CPU AND A SECURITY SERVICES PROCESSOR CONNECTED VIA A SECURE COMMUNICATION PATH

"This application claims the benefit of U.S. Provisional Application No. 60/373,571 filed Apr. 18, 2002."

BACKGROUND OF THE INVENTION

1. Field of the Invention

This invention relates to computer systems and, more particularly, to computer systems employing a trusted execution mode for protecting data stored within the computer system memory from unauthorized access.

2. Description of the Related Art

Modern computer systems are revolutionizing the way people live. This is particularly true for system platforms including microprocessors employing the x86 system architecture. The openness of x86-based systems to a myriad of owner-installable third-party peripheral devices and applications has enabled a broad marketplace of hardware and software vendors that has fostered competition, innovation, and evolution. An example of such evolution is the now widespread use of the platform as a digital communication and media system of ever-increasing quality and capability. In concert with the Internet, these system platforms are clearly revolutionizing mass distribution of digital content, allowing on-demand access to newspapers, real-time weather conditions and radio stations from around the world, on-line banking and shopping, and audio and video-based entertainment.

Since the x86 platform is an open architecture, devices typically have vendor-supplied drivers which run in Kernel mode in order to access the devices, and certain software applications may include Kernel mode components. Thus, although the open architecture may have advantages and may still provide a large degree of protection against accidental interference of one application with another, the current architectural protection mechanisms may be exposed in this environment to unwanted manipulation.

Computer systems including microprocessors employing the x86 architecture include features designed to protect against applications interfering with each other. For example, x86-based operating systems rely on two features of the x86 Protected mode architecture to provide an environment where applications are isolated from each other, and critical operating system code and data is isolated from applications: 1) paged virtual memory, and 2) execution privilege level.

Paged virtual memory allows the Operating System (OS) to define a separate virtual address space for each application, and to selectively map individual pages of physical memory into each of those virtual address spaces through a set of address translation tables. This provides each application with its own private section of physical memory for code and data that may be inaccessible to other applications. The virtual memory mechanism may also allow the OS to selectively map pages of physical memory into multiple virtual address spaces, and to selectively designate such pages in virtual space as read-only. This shared mapping capability may also allow a copy of the OS Kernel itself to reside in each application's address space, and may likewise allow shared mappings of peripheral device access ports and associated device driver routines, thus providing applications with efficient access to OS services without requiring costly address space switches. But the OS portion of the address space necessarily includes system data areas that OS code must be able to modify, and which must still be protected from application code. The read-only designation may not provide proper protection for such areas.

The x86 architecture also defines four privilege levels, 0 through 3, which are assigned to regions of code by the OS and kept in code segment descriptors. Typically, the privilege level of currently executing code or procedure will be stored as the Current Privilege Level (CPL). Thus the privilege levels are commonly referred to as CPL0 through CPL3. Using these privilege levels, certain system resources are accessible only to code executing at the proper level. The paged virtual memory architecture may allow access to pages of virtual memory to be restricted by privilege level. Although four privilege levels are defined, only the CPL0 and CPL3 levels are typically used by mainstream operating systems because the paged virtual memory architecture does not distinguish CPL1 or CPL2 from CPL0. CPL0 is commonly referred to as Kernel mode and is the most privileged level, while CPL3 is commonly referred to as User mode and is the least privileged level. OS code and data are typically assigned to CPL0 while application code and data are assigned to CPL3. CPL0 execution privilege does not override read-only protection; the two attributes are independent. Code segment descriptors are used to assign these levels.

In addition to this memory protection, all processor control registers, including those that control virtual memory operation, are by architectural definition accessible only at CPL0. In addition, special control transfer instructions are typically required to switch execution from one segment to another, and hence to switch privilege levels. These instructions allow the OS to limit the targets of such control transfers to specific entry points in OS-controlled code, hence an application may not change privilege level without simultaneously handing control over to the OS.

The isolation of address spaces from each other, and of OS memory from applications, may be completely controlled by the contents of the virtual memory address translation tables. The translation tables define the virtual-to-physical page mappings that isolate one application's memory from another, and also the read-only and privilege level attributes that protect shared libraries and the OS. The tables themselves are memory-resident data structures, and contain translation entries that map them into the shared OS memory area and restrict access to them to Kernel mode code.

The existing protection mechanisms would seem to provide adequate protection for applications and the operating system. In a well-behaved system, (e.g. correct application of these mechanisms by the operating system, and correct operation of the OS code that controls these mechanisms, and that all other code which runs in Kernel mode does not interfere with this) they do. However, typical x86-based systems include such a large amount of Kernel-mode code, not just from the OS vendors but from many independent sources, that it may be impossible for anyone to assure that such interference, whether accidental or otherwise cannot occur.

Depending on the type of operation that a user is performing and the type of software application that is running, information stored within or running on the computer system may be vulnerable to outside access. Thus, it may be desirable to improve security and thereby possibly make x86 architecture systems less vulnerable to such access.

SUMMARY OF THE INVENTION

Various embodiments of a computer system including a secure execution mode-capable processor and a security service processor connected via a secure communication link are disclosed. In one embodiment, the computer system includes a processor which may be configured to initialize a secure execution mode by executing a security initialization instruction. Further the processor may operate in the secure execution mode by executing a secure operating system code segment. The computer system also includes an input/output (I/O) interface which is coupled to the processor via an I/O link. The I/O interface may be configured to receive transactions performed as a result of the execution of the security initialization instruction. The transactions include at least a portion of the secure operating system code segment. The I/O interface may also determine whether the processor is a source of the transactions. The computer system further includes a security services processor which is coupled to the I/O interface via a peripheral bus. The I/O interface may be configured to convey the transactions to the security services processor dependent upon determining that the processor is the source of the transactions.

In one specific implementation, the I/O interface may be configured to block the transactions to the security services processor in response to determining that the processor is not the only source of the transactions.

In another specific implementation, the transactions performed as a result of the execution of the security initialization instruction include a Start transaction, a corresponding Data transaction and a corresponding End transaction.

In yet another specific implementation, the Start transaction, the Data transaction and the End transaction are packets formatted according to a HyperTransport™ specification.

BRIEF DESCRIPTION OF THE DRAWINGS

FIG. 8 is a drawing depicting one embodiment of a Hash_Data packet formatted in the HyperTransport™ protocol.

Figure 1:
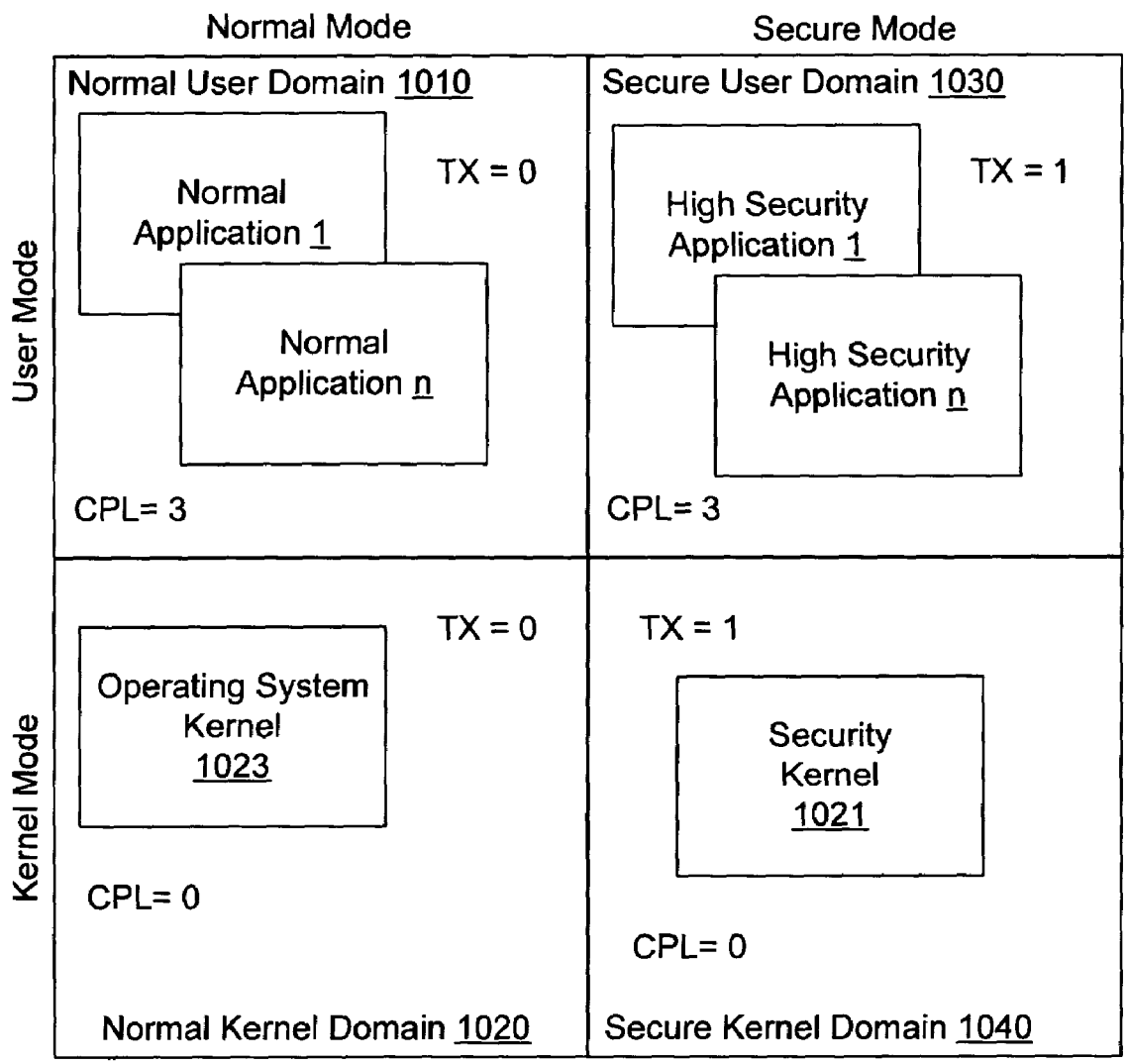
FIG. 1 is a diagram illustrating the operational domains of one embodiment of a secure execution mode capable processor and the behavior of code operating in those domains.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

Overview of a Secure Computing Platform

Trusted computing enables computer system (e.g., personal computer (PC)) users to participate in new activities such as downloading electronic cash and movies while at the same time being protected from attacks on their privacy. To be part of a trusted computing environment, the PC itself must be trusted by both the user and outside entities such as banks and content providers, for example. Critical elements which may be necessary to create a trusted PC include: a trusted processing environment, platform-specific secrets, cryptographic processing, secure storage and a secure operating system code segment referred to as a Security Kernel (SK). The building blocks to implement these elements will be described in greater detail below.

Processors configured to execute x86 instructions generally include architectural features such as Protected mode, which provides for paged virtual memory and privileged execution modes, and the set of control registers which controls these features. Controlling access to those control registers and page tables may provide additional protection from unauthorized access to program code and data within a computer system. Thus, adding a set of architectural extensions to such processors and corresponding software support may provide this protection. The overall security enhancements to a processor may be referred to as a Secure Execution Mode (SEM). Secure Execution Mode (SEM) is a new operating mode added to a processor that creates a trusted execution environment in which a Security Kernel can run free from external tampering.

Accordingly, a processor capable of operating in SEM may include security hardware (not shown) which, when enabled by SEM, provides support for SEM operating modes such as a trusted execution (TX) mode of operation, for example. As will be described further below, the trusted execution mode may include, depending on what software is executing and its privilege level, the SEM-capable processor operating in a secure user mode and a secure kernel mode in addition to the normal user mode and normal kernel mode. Mechanisms may also be provided to create a protected memory region that may only be accessible by software running within this environment as well as from hardware memory accesses (e.g., direct memory access (DMA)).

The new Trusted Execution environment (TX) is somewhat analogous to the traditional normal/protect mode (Ring 3/Ring 0) mechanism used to separate User and Kernel environments. As described in greater detail below in conjunction with the description of FIG. 1, the combination of User/Kernel modes with trusted/non-trusted modes creates a four-quadrant model. Thus, an SEM-capable CPU contains the hardware mechanisms that create and enforce the TX mode.

Turning now to FIG. 1, a diagram illustrating the operational domains of one embodiment of a secure execution mode-capable processor and the behavior of code operating in those domains is shown. As described above, current x86-based operating systems typically use two of the four available privilege levels (e.g., CPL0 and CPL3) to implement two modes within a normal execution mode or protection domain: Normal Kernel Mode and Normal User Mode. The SEM enhancements, when SEM is enabled, define a new execution mode which is referred to as trusted execution (TX) mode. When combined with the existing normal execution mode protection domains, TX mode creates the four distinct modes or software operational domains described below. In the illustrated embodiment, the four domains are normal user (NU) domain 1010, normal kernel (NK) domain 1020, secure user (SU) domain 1030 and secure kernel (SK) domain 1040.

The NU 1010 domain may be characterized by a processor running in normal user mode (i.e. CPL=3) and not in trusted execution (TX) mode. In the NU 1010 domain, typical virtual memory settings allow for normal operation of unmodified applications. Under SEM, such applications are however prevented from accessing the memory of applications residing in the SU domain 1030, or the memory containing Security Kernel 1021 in the SK domain 1040. Further, such applications are prevented from accessing the memory of the OS Kernel 1023 or device drivers in the Normal Kernel domain 1020 by existing protection logic mechanisms such as U/S and R/W page attributes for example (not shown).

In the NK domain 1020, SEM allows for normal operation of unmodified OS Kernel 1023 components and kernel-mode device drivers. Code executing in this domain may access objects in the NU domain 1010, but is prevented under SEM from accessing objects in either the SU domain 1030 or the SK domain 1040. Further, the NK domain 1020 may be characterized by a processor running in Normal Kernel mode (i.e. CPL=0) but not in TX mode. When paging is enabled in the NK domain 1020, a processor may sometimes be referred to as operating in a Native kernel mode.

In the SU domain 1040, SEM may allow a new type of application software such as high security application (HSA) 1, for example to run. HSA software may be prevented from accessing objects in any other domain by existing x86 page protection and page mapping mechanisms. In addition, the HSAs are protected from unauthorized access by any code executing in the NU domain 1010 and the NK domain 1020, including the operating system kernel 1023 and device drivers (not shown in FIG. 2). As will be described in greater detail below, Security Kernel 1021 may be responsible for setting up and maintaining the virtual address spaces of HSAs. Further, the SU domain 1040 may be characterized by a processor running in User mode (i.e. CPL=3) but also in TX mode, which may also be referred to as a secure user mode.

In the SK domain 1040, SEM may allow Security Kernel 1021 full access to all platform resources and in addition may give exclusive control of those resources to Security Kernel 1021. The SK domain 1040 may be characterized by a processor running in Kernel mode (i.e. CPL=0) and also in TX mode, which may also be referred to as a secure kernel mode.

Generally speaking, Security Kernel 1021 is software which runs in the trusted execution (TX) mode. In one embodiment, Security Kernel 1021 may be the only software that runs in SK domain 1040. In SK domain 1040, security kernel 1021 may control all virtual-to-physical memory mappings, and may control what areas of physical memory are accessible to external devices. However, Security Kernel 1021 may rely on the OS kernel's process creation functions, including normal mode virtual memory mappings, initial mapping of HSA memory and loading of HSA code and data sections. Security Kernel 1021 may however monitor every such mapping to ensure that there is no unauthorized mapping of trusted memory into untrusted virtual spaces. Thus, Security Kernel 1021 may regard all areas of memory that are not trusted as untrusted. Further, Security Kernel 1021 may regard all running program code that is not controlled by Security Kernel 1021 to be untrusted. It is noted that in one embodiment, Security Kernel 1021 may be a stand-alone code segment which may be a patch to an existing OS. In alternative embodiments, Security Kernel 1021 may be a module or code segment within and part of a given OS.

Major functions of SEM include placing the system in the trusted environment by initializing the processor to run in SEM, verifying the authenticity of the SK, and protecting the trusted environment from outside attacks. It is noted that the terms CPU, microprocessor and processor may be used interchangeably.

Secure Execution Mode Initialization

Central to creating a trusted PC is a unique, platform specific, secret. In practice, this secret may be the private half of a public/private cryptographic key pair. The secret must only be used when the PC is operating within the trusted environment, and it must never be revealed to anyone—or any code. The results of cryptographic operations using the secret can be revealed, but not the secret itself. For this to work, the secret and the cryptographic processing machinery that uses it must exist in a closed box with controlled inputs and outputs. In practical terms, a closed box refers to a single integrated circuit (IC) package that combines processing capability and nonvolatile storage. This device is referred to as a Security Services Processor (SSP). In one embodiment, at least one SSP is required and exactly one SSP participates in the platform initialization process.

Architecturally, the SSP may be located anywhere in the platform. The only requirement is that a non-spoofable and secure communication path exist between the SEM-capable processor and the SSP. As used herein, a non-spoofable communication path between the SEM-capable processor and the SSP refers to a secure communication path in which the SSP does not receive commands from either software executing outside of the trusted environment or from DMA hardware. This may be especially complicated when the trusted environment is being initialized. Here, the SSP must verify the validity of the SK and be certain that the SK that is being validated is actually the code running at that instant on the SEM-capable processor. The validation takes the form of a cryptographic hash of the SK image. This hash must be delivered to the SSP in a manner that could not have resulted from the operation of normal software. Further, the SEM-capable processor must begin execution of the SK from a clean init state (and the SSP must know this). These requirements may be met by using CPU microcode and hardware mechanisms that are unavailable to normal software. Specifically, a new security initialization instruction referred to as a Security Kernel Initialization (SKINIT) instruction is used to: initialize the SEM-capable processor, verify that other processors in an MP system are stopped, communicate with the SSP using reserved system addresses and jump into the SK code. It is noted that in one embodiment, the SKINIT instruction is a single instruction having multiple components which execute atomically. It is further noted that in one embodiment, the initialization process includes two steps: the validation of a small Secure Loader (SL) by the SSP, followed by the validation of the much larger SK.

Computer Systems Employing a Trusted Computing Platform

Figure 2:
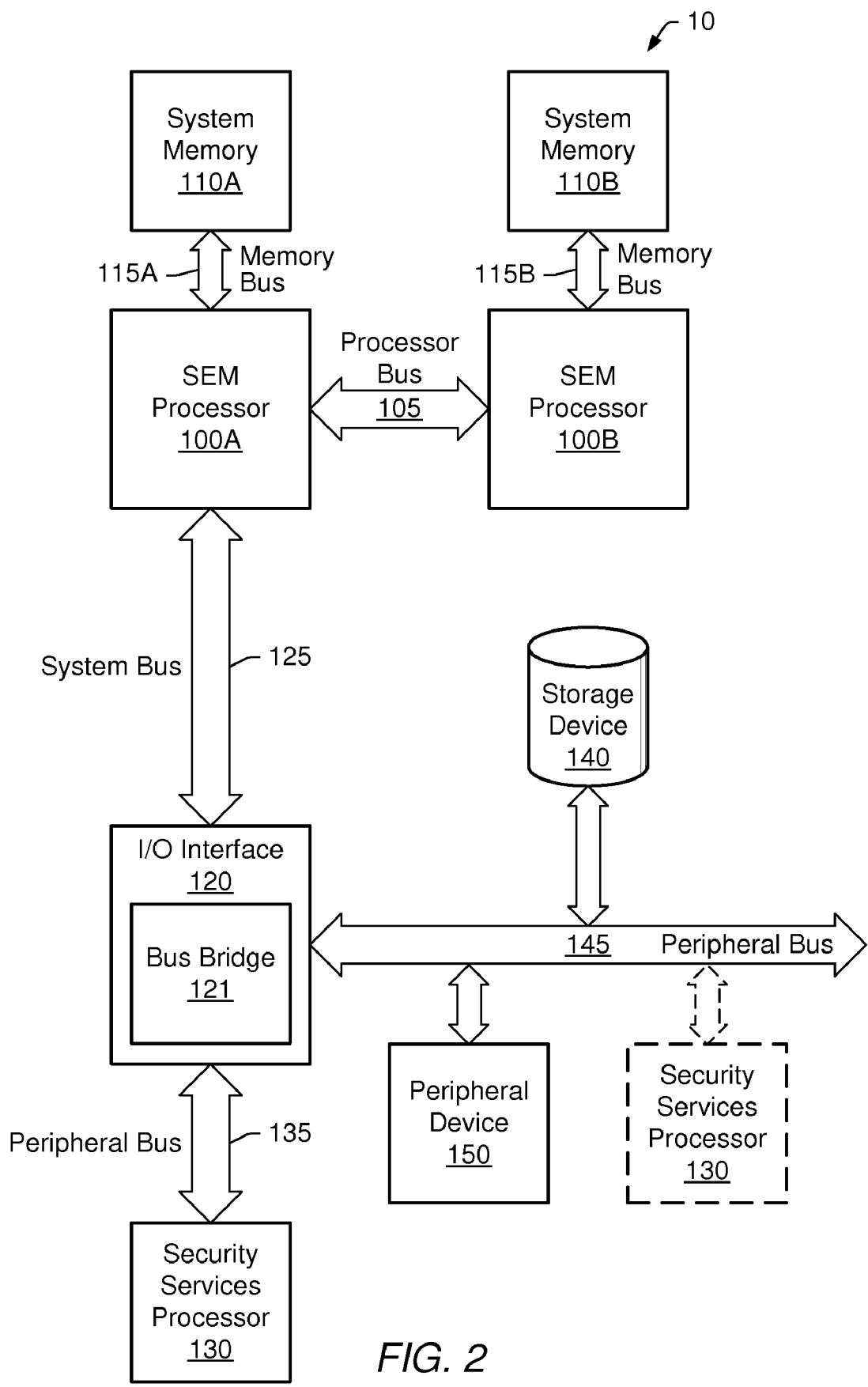
FIG. 2 is a block diagram of one embodiment of a computer system employing a trusted computing platform.

Referring to FIG. 2, a block diagram of one embodiment of a computer system employing a trusted computing platform is shown. Computer system 10 includes two SEM capable processors designated SEM processor 100A and SEM processor 100B. SEM processor 100A is coupled to SEM processor 100B via a processor bus 105. Computer system 10 also includes a system memory 110A which is coupled to SEM processor 100A and a system memory 110B which is coupled to SEM processor 100B. SEM processor 100A is coupled to an I/O interface 120 via a system bus 125. I/O interface 120 is coupled to a storage device 140 and to a peripheral device 150 via a peripheral bus 145. I/O interface 120 is further coupled to SSP 130 via peripheral bus 135. In an alternative embodiment, instead of peripheral bus 135, SSP 130 may be coupled to peripheral bus 145 as indicated by the dotted lines. It is noted that although two SEM processors are shown, other embodiments may include other numbers of SEM processors. It is also noted that components having the same reference number and a letter may be referred simply to by the reference number alone. For example, SEM processor 100A may be referred to simply as SEM processor 100 where appropriate.

In the illustrated embodiment, SEM processor 100A and SEM processor 100B each include an integrated memory controller (not shown) for connection to system memories 110A and 110B, respectively. It is noted that in alternative embodiments, I/O interface 120 may include one or more memory controllers and a host bridge. In such embodiments, system memories 110 may be connected to I/O interface 120.

SEM processor 100 is illustrative of a processor employing the x86 architecture. For example, in one embodiment, SEM processor 100 may be an Athlonr processor by Advanced Micro Devices, Inc. As such, SEM processor 100 is configured to execute x86 instructions which may be stored in system memory 110 or storage device 140. In the illustrated embodiment, SEM processor 100 may include security hardware (not shown) that, when enabled by SEM, provides support for SEM operating modes such as the trusted execution (TX) mode described above in conjunction with the description of FIG. 1, for example.

System memory 110 is configured to store program instructions and data that is frequently used by SEM processor 100. In a typical system configuration, storage device 140 may be used to more permanently store the program instructions and data and as SEM processor 100 needs the data and program code, it may be transferred to system memory 110. Additional support for SEM operating modes may be provided by the security kernel which may be executed in conjunction with the OS out of system memory 110 during operation of SEM processor 100. In addition, system memory 110 may be partitioned into a trusted portion and an untrusted portion. The security kernel resides in the trusted portion of system memory 110. As described above, system memory 110 is typically accessed using paged virtual memory. In such an arrangement, system memory 110 may be accessed by individual pages or chunks of memory. This paging function is typically handled by OS memory management functions.

In one embodiment, system memory 110 may be implemented using a plurality of memory chips implemented in dynamic random access memory (DRAM) technology or in one of the varieties of DRAM technologies available, such as synchronous DRAM (SDRAM), for example. The DRAM chips are typically mounted on small circuit boards having an edge connector which are inserted into a socket connector on a motherboard. Depending on the configuration of the boards, they may be referred to as either single or dual in-line memory modules (e.g. SIMs or DIMMs, respectively). System memory 110 may include multiple banks of memory modules which may allow memory expansion.

As described above, storage device 140 may store program code and data. In one embodiment, storage device 140 may be a hard disk drive or a bank of hard disk drives, although other embodiments are contemplated that include other mass storage devices such as CD-ROM drives, floppy disk drives and tape drives, for example.

Peripheral device 150 maybe any peripheral device such as a modem, video capture device or other general purpose input output device, for example. It is noted that in other embodiments, other numbers of peripheral devices may be used.

I/O interface 120 may be configured to provide bus control and translation for transactions between different peripheral buses and SEM processors 100A and 100B during normal system operation. In one embodiment, I/O interface 120 includes a bus bridge 121 which may perform functions associated with a Northbridge. For example, peripheral bus 145 may be a peripheral component interconnect (PCI) bus and peripheral bus 135 may be a low pin count (LPC) bus. In addition, bus bridge 121 may be configured to provide security mechanisms (not shown in FIG. 2) which allow non-spoofable communication to occur between SEM processor 100 and SSP 130 during a secure initialization. For example, bus bridge 121 maybe configured to determine whether an SSP is connected to it and to which bus. As described further below, depending on the bus type, bus bridge 121 may be configured to perform various security related functions such as the translation of security initialization instructions received from SEM processor 100A on system bus 125 into a format suitable for conveyance on peripheral bus 135. For example, bus bridge 121 may be configured to recognize SKINIT related messages and transport those messages to SSP 130 in the specific format of peripheral bus 135. Further, bus bridge 121 may be configured to block peer-to-peer traffic to SSP 130 by such mechanisms as address filtering, for example. Bus bridge 121 may also be configured to enforce an access window into memory mapped I/O of SSP 130 during SKINIT operations.

Generally speaking, the Security Kernel Initialization instruction (SKINIT) executes on SEM-capable processors such as SEM processor 100A and SEM processor 100B, for example. As described above, the SKYIT instruction may be a single instruction having multiple components which execute atomically. In addition, in one embodiment, the SKINIT instruction may have a single input operand such as the contents of the EAX register, for example. In one embodiment, the SKINIT instruction includes three execution phases: Initialization, Data Transfer and Jump.

During the initialization phase, SEM processor 100A state may be reset and any microcode patches may be cleared. In addition, the SL image may be loaded into system memory 10A and to protect the SL image prior to preventing DMA accesses from occurring, accesses to a 64K-byte contiguous space in physical memory where the SL image resides are blocked. This 64K-byte area is referred to as the Secure Loader Block (SLB). The base address of this 64K-byte space is a parameter of the SKIMIT instruction (e.g., input to SKINIT using EAX). A Hash_Start transaction carries with it this base address as part of its address field. In this way, all memory controllers receiving the Hash_Start transaction may be informed of which memory area to protect.

During the data transfer phase, the microcode may perform a Hash_Start, a Hash_Data and a Hash_End command. In one embodiment, the Hash_Start transaction may be a broadcast transaction sent on all intervening links and buses between SEM processor 100A and SSP 130. In the illustrated embodiment, Hash_Start may be sent on processor bus 105, system bus 125 and peripheral bus 135. In a multiprocessor environment, SEM processor 100A waits for a response from SEM processor 100B. SEM processor 100B may respond to the message with a status bit indicating that either: "APIC Init Mode is Active" or "APIC Init Mode is Inactive." If SEM processor 100B does not respond with "APIC Init Mode is Active," SEM processor 100A may finish the Hash_Start and then perform a Hash_End, thereby skipping the Hash_Data command. Assuming that SEM processor 100B responds with "APIC Init Mode is Active," the Hash_Start command is passed to SSP 130 followed by the Hash_Data command. The host bridge/memory controller (not shown) associated with each of SEM processors 100A and 100B may turn on memory, I/O, and DMA exclusion protections.

Once the Hash_Start transaction is sent to SSP 130, the microcode may perform a Hash_Data transaction. The Hash_

Data transaction fetches the SL code image from system memory 110A and sends it across system bus 125 to I/O interface 120.

Once the Hash_Data transaction and its corresponding data is sent to SSP 130, the microcode may perform a Hash_End transaction. The Hash_End transaction may be sent as a broadcast transaction on all intervening links and buses between SEM processor 100A and SSP 130.

I/O interface 120 receives the SL image bounded by the Hash Start/End messages. Transactions received outside of the Start/End window are ignored. The data is sent to SSP 130. Bus bridge 121 may be configured to prevent any other transactions to the SSP 130 address range associated with SKINIT transactions between Hash_Start and Hash_End.

During the jump phase, the SKINIT instruction completes with a jump to the SL.

In one embodiment, when SSP 130 receives the data payload (i.e., the SL image) of the Hash_Data transactions and a Hash_End transaction, it performs a cryptographic hash of the image and compares the result with internally stored values. If there is a match, then SSP 130 may validate the SL image by storing an internal indication that the SL image is valid. In this state, SSP 130 is referred to as being 'armed' and is now prepared to participate in subsequent operations such as validating a hash of the much larger Security Kernel, for example.

It is noted that in embodiments where SSP 130 is coupled to peripheral bus 145, bus bridge 121 may be configured to perform translation and security related functions relative to peripheral bus 145.

Figure 3:
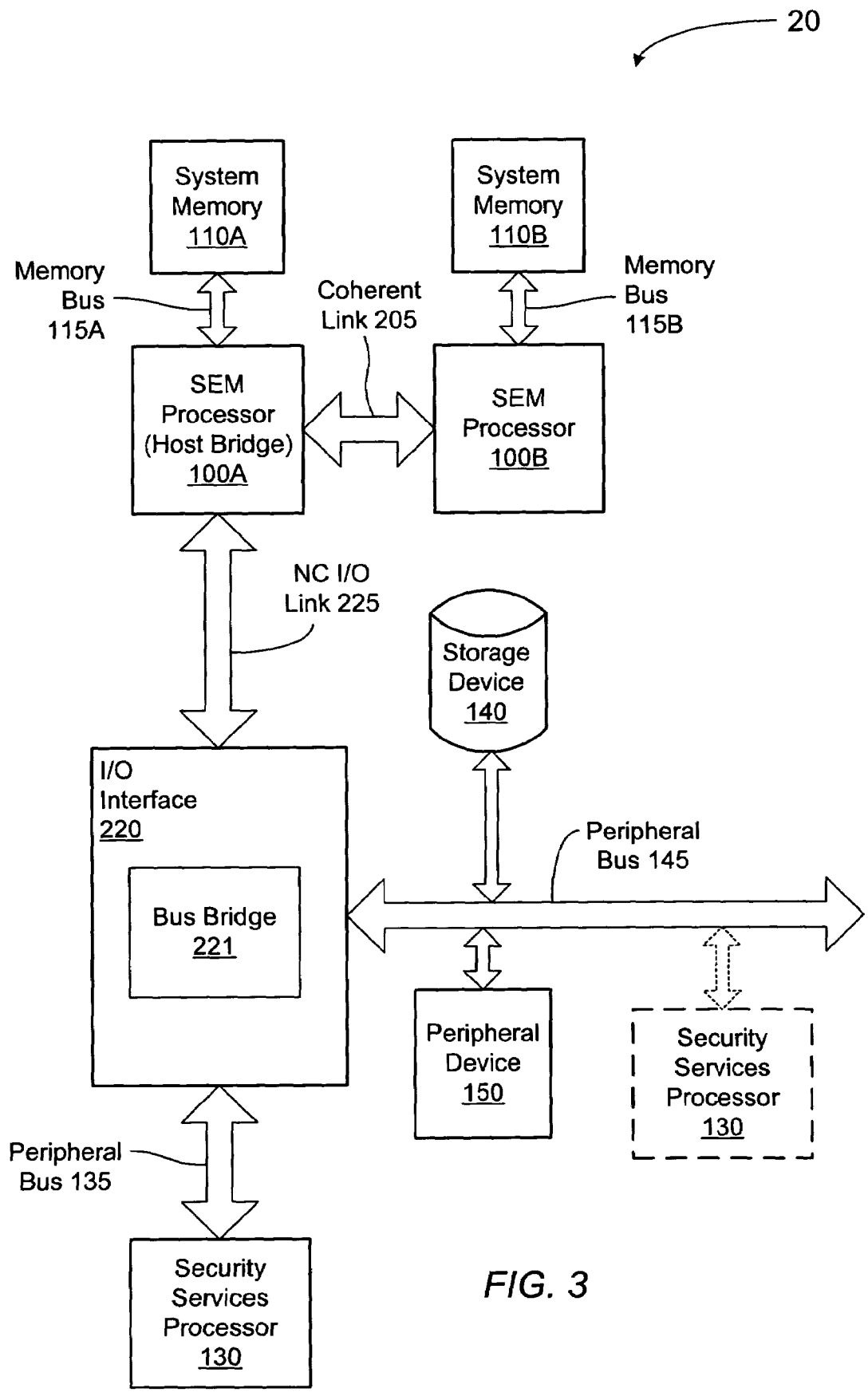
FIG. 3 is a block diagram of another embodiment of a computer system employing a trusted computing platform.

Referring to FIG. 3, a block diagram of another embodiment of a computer system employing a trusted computing platform is shown. Components corresponding to those shown FIG. 2 are numbered identically for simplicity and clarity. Computer system 20 includes two SEM capable processors, designated SEM processor 100A and SEM processor 10B. SEM processor 100A is coupled to SEM processor 100B via a coherent link 205 which may form a high-speed point-to-point link. Computer system 20 also includes a system memory 110A which is coupled to SEM processor 100A and a system memory 110B which is coupled to SEM processor 100B. SEM processor 100A is coupled to an I/O interface 220 via a non-coherent I/O link 225. Non-coherent I/O link 225 may also be a high-speed point-to-point link. I/O interface 220 is coupled to a storage device 140 and to a peripheral device 150 via a peripheral bus 145. I/O interface 220 is further coupled to SSP 130 via a peripheral bus 135. In an alternative embodiment, instead of peripheral bus 135, SSP 130 may be coupled to peripheral bus 145 as indicated by the dotted lines. It is noted that although two SEM processors are shown, other embodiments may include other numbers of SEM processors.

In the illustrated embodiment, SEM processor 100A and SEM processor 100B each include an integrated memory controller (not shown) for connection to system memories 110A and 110B, respectively. In addition, SEM processor 100A includes integrated host bridge logic (not shown) for connection to non-coherent link 225 and for conveying messages between SEM processor 100A and SEM processor 100B upon coherent link 205. Although it is noted that other embodiments are contemplated in which the host bridge may be a stand-alone (i.e., a Northbridge), or a combination.

In the illustrated embodiment, coherent link 205 and non-coherent I/O link 225 are each implemented as a set of uni-directional wires. Each wire of a given set may convey transactions in a different direction. The coherent link 205 may be operated in a cache coherent fashion for communication between SEM processors 100A and 100B. Further, non-coherent I/O link 225 may be operated in a non-coherent fashion for communication between I/O interface 220 and a host bridge such as the host bridge of SEM processor 100A. The interconnection of two or more devices via coherent links may be referred to as a "coherent fabric". Similarly, the interconnection of two or more devices via non-coherent links may be referred to as a "non-coherent fabric." It is noted that in one embodiment, non-coherent I/O link 225 may be compatible with HyperTransport™ technology.

Generally speaking, a packet is a communication between two nodes or devices (an initiating node which transmits the packet and a destination node which receives the packet). The initiating node and the destination node may differ from the source and target node of the transaction of which the packet is a part, or either node may be either the source node or the target node. A control packet is a packet carrying control information regarding the transaction. Certain control packets specify that a data packet follows. The data packet carries data corresponding to the transaction and corresponding to the specifying control packet. In one embodiment, control packets may include command packets, info packets and response packets. It is noted that other embodiments are contemplated which include other types of packets.

As packets travel upstream or downstream on the non-coherent links or between coherent nodes on the coherent links, the packets may pass through one or more nodes. As used herein, "upstream" refers to packet traffic flow in the direction of the host bridge of SEM processor 110A from I/O interface 220 and "downstream" refers to packet traffic flow in the direction away from the host bridge of SEM processor 110A to I/O interface 220.

Similar to the description of FIG. 2, SEM processor 100 of FIG. 2 is illustrative of a processor employing the x86 architecture. As such, SEM processor 100 is configured to execute x86 instructions which may be stored in system memory 110 or storage device 140. In the illustrated embodiment, SEM processor 100 may include security hardware (not shown) which, when enabled by SEM, provides support for SEM operating modes such as the trusted execution (TX) mode of operation as described above, for example.

As will be described in greater detail below, to enforce a non-spoofable secure communication path using Hyper-Transport™ technology, a host bridge may also be configured to perform security related functions. For example, the host bridge of SEM processor 100A may: perform I/O space exclusion, SKINIT-related message support and have knowledge of whether SSP 130 resides on its downstream bus. I/O space exclusion refers to blocking any transactions to I/O space arriving from a downstream bus. For example, upstream transactions are not allowed either to cross the bridge to the upstream bus or be reflected back down the downstream bus. In addition, any upstream access to the HyperTransport™ 40-bit configuration address window (FD_FE00_0000h_FD_FFFF_FFFFh) may be blocked by the host bridge. In one embodiment, these accesses may be terminated either with a Target Abort or a Master Abort.

As described above in conjunction with the description of FIG. 2, the host bridge within SEM processor 100A may be configured to transmit the Hash_Start, Hash_Data, and Hash_End transactions. In one embodiment, the Hash_Start and Hash_End messages are Broadcast packets while the Hash_Data transactions include non-posted Sized Write request packets followed by data packets containing the data payload. The descriptions of FIG. 6 through FIG. 8 below discuss exemplary Hash_Start, Hash_Data, and Hash_End Hyper-Transport™ packets. The 40-bit addresses for these transactions are specified below. In one embodiment, it is the responsibility of the HyperTransport™ host bridge of SEM processor 100A to ensure that transactions to these addresses come only from the SEM processor 100A as part of the SKINIT instruction. It is noted that the following address ranges used here for security initialization are designated as Reserved in the HyperTransport™ specification:

FD_F920_0000h-FD_F923_FFFFh Hash_Start
FD_F924_0000h-FD_F927_FFFFh Reserved
FD_F928_0000h-FD_F928_0003h Hash_End
FD_F928_0004h-FD_F928_0007h Hash_Data
FD_F928_0008h-FD_F92F_FFFFh Reserved System memory 110 operates in substantially the same way as system memory 110 described above in conjunction with the description of FIG. 2. For example, system memory 110 of FIG. 3 is also configured to store program instructions and data that is frequently used by SEM processor 100. Additional support for SEM operating modes may be provided by the Security Kernel which may be executed in conjunction with the OS out of system memory 110 during operation of SEM processor 100. In addition, as described above, system memory 110 may be partitioned into a trusted portion and an untrusted portion. The Security Kernel resides in the trusted portion of system memory 110. As described above, system memory 110 is typically accessed using paged virtual memory. In such an arrangement, system memory 110 may be accessed by individual pages or chunks of memory. This paging function is typically handled by OS memory management functions.

As described above, storage device 140 may store program code and data. In one embodiment, storage device 140 may be a hard disk drive or a bank of hard disk drives, although other embodiments are contemplated that include other mass storage devices such as CD-ROM drives, floppy disk drives and tape drives, for example.

Peripheral device 150 may be any peripheral device such as a modem, video capture device or other general purpose input output device, for example. It is noted that in other embodiments, other numbers of peripheral devices may be used.

In the illustrated embodiment, I/O interface 220 includes a bus bridge 221 which may include hardware (not shown in FIG. 3) configured to bridge non-coherent HyperTransport™ transactions conveyed upon NC I/O link 225 and bus transactions conveyed upon both peripheral bus 135 and bus transactions conveyed upon peripheral bus 145. In one embodiment, peripheral bus 135 is a low pin count (LPC) bus. In addition, peripheral bus 145 may be a peripheral component interconnect (PCI) bus. In such an embodiment, bus bridge 221 which may be configured to bridge non-coherent HyperTransport™ transactions conveyed upon NC I/O link 225 and LPC bus transactions conveyed upon both LPC bus 135 and bus transactions conveyed upon PCI bus 145. It is noted that in one embodiment the LPC bus may be a non-enumerable, serial bus which may use four wires to convey control, address and data information between a host and a peripheral. The information communicated is: start, stop (abort a cycle), transfer type (memory, I/O, DMA), transfer direction (read/write), address, data, wait states, DMA channel, and bus master grant. For more information regarding the LPC bus, refer to the Low Pin Count Interface Specification revision 1.1, provided by Intel®. In addition, the PCI bus may be generally characterized as a parallel, multiplexed address and data bus. Further, for more information regarding the PCI bus, refer to the PCI Local Bus Specification revision 2.2, provided by the PCI Special Interest Group.

I/O interface 220 is configured to provide bus control and translation for transactions between different peripheral buses during normal system operation. In addition, bus bridge 221 may include security mechanisms which allow non-spoofable communication to occur between SEM processor 100 and SSP 130 during a secure initialization. For example, bus bridge 221 may be configured to determine whether an SSP is connected to it and to which bus. Further, as described below in conjunction with the description of FIG. 4 and FIG. 5, bus bridge 221 may be configured to perform various security related functions such as the translation of security initialization transactions. For example, bus bridge 221 may be configured to recognize the SKINIT messages received on NC I/O link 225 and to transport those messages to SSP 130 in a format suitable for conveyance on LPC bus 135 or PCI bus 145 as necessary, dependent upon the location of SSP 130. Further, bus bridge 221 maybe configured to block peer-to-peer traffic to SSP 130. Bus bridge 221 may also be configured to enforce an access window into memory mapped I/O of SSP 130 during SKINIT operations.

As will be described in greater detail below in conjunction with the description of FIG. 4 and FIG. 5, bus bridge 221 may include logic (not shown in FIG. 3) configured to terminate the SKINIT-related HyperTransport™ messages and to convey those messages to SSP 130 over LPC bus 135 bus or PCI bus 145 as necessary, dependent upon the location of SSP 130 and in the correct format. Further, bus bridge 221 may include logic (not shown) configured to exhibit HyperTransport™ to SSP flow control. For example, bus bridge 221 may either absorb a continuous flow of Hash_Data transactions arriving at the supported HyperTransport™ data rate, or invoke flow control on the upstream NC I/O link 225.

Bus bridge 221 may also include logic (not shown in FIG. 3) which may be configured to enforce the Hash_Start, Hash_End access window rules. Specifically, no accesses may be allowed to the SSP memory mapped I/O address window between the Hash_Start and Hash_End bounds except for Hash_Data transactions received from the upstream link. This includes any peer-to-peer traffic on LPC bus 335 or PCI bus 145, dependent upon where SSP 130 resides.

Figure 4:
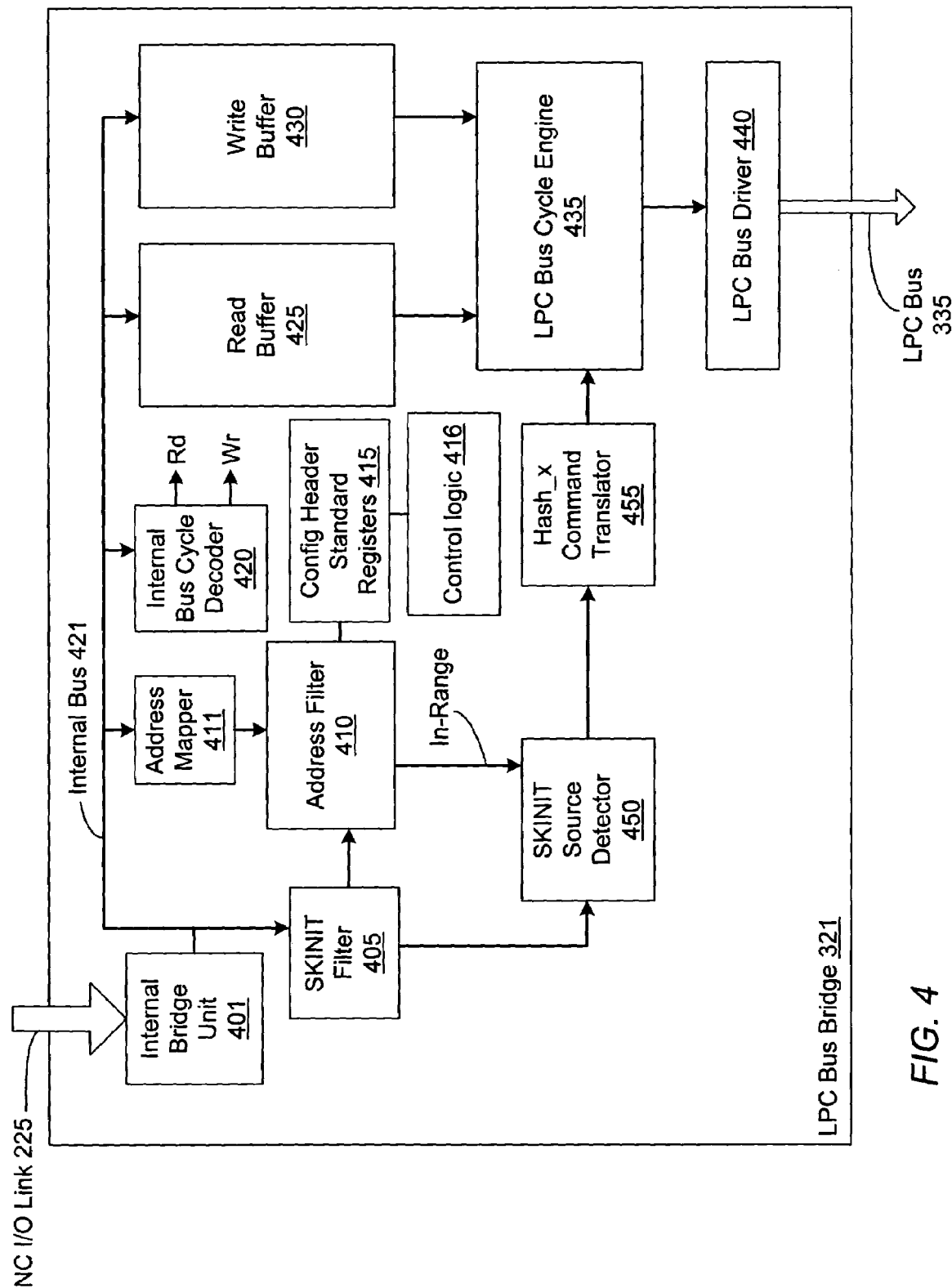
FIG. 4 is a block diagram of one embodiment of an I/O interface unit for connection to a security services processor.

Turning to FIG. 4 a block diagram of one embodiment of the bus bridge of FIG. 3 is shown. Components corresponding to those shown in FIG. 3 are numbered identically for clarity and simplicity. LPC bus bridge 321 includes an internal bridge unit 401 coupled to NC I/O link 225 and to internal bus 421. LPC bus bridge 321 also includes an SKINIT filter 405 coupled to internal bridge unit 401 and to an SKINIT source detector 450. LPC bus bridge 321 also includes an address mapper 411 which is coupled to an address filter 410 which is further coupled to SKINIT filter 405. LPC bus bridge 321 also includes a control logic 416 which is coupled to control a configuration header standard registers 415. LPC bus bridge 321 also includes an internal bus cycle decode unit 420 which is coupled to internal bus 421. LPC bus bridge 321 also includes a read buffer 425 and a write buffer 430 which are both coupled to internal bus 421. LPC bus bridge 321 also includes a Hash_x command translator 455 which is coupled between SKINIT source detector 450 and a LPC bus cycle engine 435. Further, LPC bus bridge 321 includes a LPC bus driver 440 which is coupled to LPC bus 335.

In the illustrated embodiment, internal bus 421 may be used to convey transactions internally within LPC bus bridge 321. Transactions received upon NC I/O link 225 may be received by internal bridge unit 401 and translated to internal bus cycles. In one embodiment, internal bridge unit 401 may be configured to receive HyperTransport™ messages upon NC I/O link 225 and to translate those messages into PCI bus cycles for conveyance upon internal bus 421. For example, HyperTransport™ messages such as Hash_Start, Hash_End and Hash_Data messages as described below in conjunction with the descriptions of FIG. 6 through FIG. 8 may be sent.

As internal bridge unit 401 receives transactions from NC I/O link 225, SKINIT filter 415 may be configured to recognize SKINIT transactions. If the transactions are SKINIT transactions, they may be forwarded to SKINIT source detector 450. Address mapper 411 may map the received addresses into corresponding LPC bus 335 addresses as shown below. Address filter 410 may receive the PCI transactions corresponding to the HyperTransport™ messages and if the addresses of the transactions are within the 256-byte security initialization address window of SSP 130, an in-range signal may be provided by address filter 410 to SKINIT source detector 450. As described further below, address filter 410 may use configuration header standard registers 415 to compare the incoming message addresses. In one embodiment, configuration header standard registers 415 may be programmed by the contents of a base address register (not shown) of SSP 130 during system boot-up. This programming may be accomplished with the aid of the basic input/output system (BIOS).

In one embodiment, the SL validation and memory mapped I/O transactions may be mapped by address mapper 411 of LPC bus bridge 321 into a 4K-byte fixed address range on LPC bus 335 as follows:

| | |
|---|---|
| FED0_0000h-FED0_0003h | Hash_End |
| FED0_0004h-FED0_0007h | Hash_Data |
| FED0_0008h-FED0_000Bh | Hash_Start |
| FED0_000Ch-FED0_00FFh | Reserved |
| FED0_0100h-FED0_0103h | Device_ID-Vendor_ID register |
| FED0_0104h-FED0_0107h | Class_Code-Revision_ID register |
| FED0_0108h-FED0_010Bh | Subsystem_ID - Subsystem_Vendor_ID register |
| FED0_010Ch-FED0_01FFh | Reserved |
| FED0_0200h-FED0_0FFFh | SSP Memory-Mapped I/O Window |
| FED0_1000h-FEDF_FFFFh | Reserved |

It is noted that transactions on LPC bus 335 are byte reads and writes. Accordingly, any Hash_Data Dword transactions received on NC I/O link 225 may be translated into corresponding byte transactions.

SKINIT source detect 450 may be configured to determine the source of the transactions. If SKINIT source detect 450 determines that the source of the SKINIT transactions is not the host bridge, the SKINIT transactions may be dropped or discarded. In one embodiment, a system reset may be initiated in response to receiving SKI transactions in which the host bridge is not the only source. However, if SKINIT source detect 450 determines that the source of the SKINIT transactions is the host bridge of SEM processor 100A and that the addresses of the transactions are within the security initialization window, as determined by the in-range signal, then the SKINIT transactions are allowed to be translated into LPC commands by Hash_x command translator 455 and mapped into the associated LPC addresses. LPC bus cycle engine 435 may then generate the appropriate LPC bus cycles. LPC bus driver 440 may then generate the appropriate signals to drive the bus cycles onto LPC bus 335 for conveyance to SSP 130.

Read buffer 425 and write buffer 430 may be storages configured to store data associated with each internal bus cycle. As transactions are conveyed upon internal bus 421, internal bus cycle decoder 420 may determine whether the transaction is a read cycle or a write cycle. Any data associated with the cycle may be stored in the appropriate buffer for use by LPC bus cycle engine 435 when generating LPC bus cycles.

Since LPC bus 335 is a non-enumerable bus, LPC bus bridge 321 provides a configuration header for SSP 130 which may be visible and accessible to software dependent upon whether SSP 130 is present. In one embodiment, configuration header standard registers 415 may be compatible with a standard PCI configuration header. During system boot-up, BIOS may check for the presence of SSP 130 on LPC bus 335. If SSP 130 is detected, BIOS may set a bit in control logic 416 which may enable the standard registers of configuration header 415 to be seen and accessed by software. Alternatively, a hardwired jumper may be-soldered in place when SSP 130 is installed and read by control logic 416 at start up. Otherwise, if there is no SSP present, the configuration header and its standard registers 415 may be hidden from software by control logic 416. In addition, SSP 130 may include a set of read-only registers which are mapped at fixed LPC bus addresses. BIOS may read these registers and load the values into the enumeration registers of configuration header standard registers 415. In one embodiment, the following SSP read-only registers may be mapped at fixed LPC addresses:

| Address | Register |
|---|---|
| FED0_0100 | Bits [31:16] = Device ID Bits [15:0] = Vendor ID |
| FED0_0104 | Bits [31:8] = Class Code Bits [7:0] = Revision ID |
| FED0_0108 | Bits [31:16] = Subsystem ID Bits [15:0] = Subsystem Vendor ID |

In one embodiment, LPC bus bridge 321 may also include an interrupt mechanism for SSP 130. LPC bridge 321 may provide a mapping for the SSP interrupt through the configuration header interrupt registers within configuration header standard registers 415. In one embodiment, LPC bus bridge 321 may fix the mapping of the SSP interrupt and report it to the configuration header. Alternatively, BIOS may program the configuration header registers.

Accordingly, from the foregoing description, LPC bus bridge 321 may allow accesses to the security initialization address window of SSP 130 which originate from the host bridge of SEM-capable processor 100 and block other accesses such as peer-to-peer accesses during a security initialization of SEM-capable processor 100.

Although the embodiment of LPC bus bridge 321 described above in conjunction with the description of FIG. 4 includes functionality associated with specific blocks, it is noted that the specific blocks used are for discussion purposes only and that other embodiments are contemplated which may include other blocks configured to perform similar functions.

Figure 5:
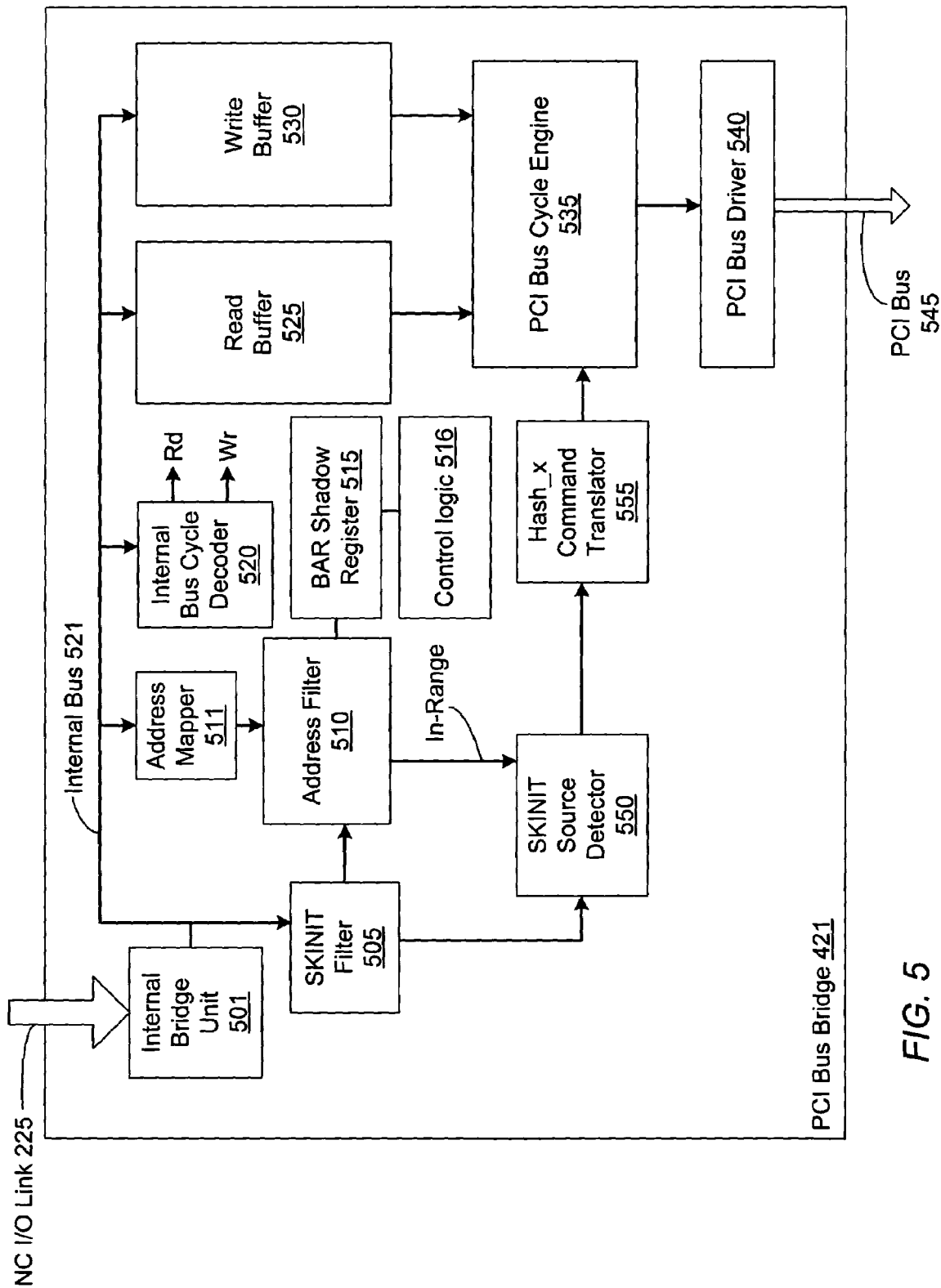
FIG. 5 is a block diagram of another embodiment of an I/O interface unit for connection to a security services processor.

Referring to FIG. 5, a block diagram of another embodiment of the bridge unit of FIG. 3 is shown. Components that correspond to those shown in FIG. 2 through FIG. 3 are numbered identically for clarity and simplicity. PCI bus bridge 421 includes an internal bridge unit 501 coupled to NC I/O link 225 and to internal bus 521. PCI bus bridge 421 also includes an SKINIT filter 505 coupled to internal bridge unit 501 and to an SKINIT source detector 550. PCI bus bridge 421 also includes an address mapper 511 which is coupled to an address filter 510 which is further coupled to SKINIT filter 505 and to a base address register (BAR) shadow register 515. PCI bus bridge 421 also includes an internal bus cycle decoder 520 which is coupled to internal bus 521. PCI bus bridge 421 also includes a read buffer 525 and a write buffer 530 which are both coupled to internal bus 521. PCI bus bridge 421 also includes a Hash_x command translator 555 which is coupled between SKINIT source detector 550 and a PCI bus cycle engine 535. Further, PCI bus bridge 421 includes a PCI bus driver 540 which is coupled to PCI bus 545.

In one embodiment, BAR shadow register 515 may be programmed with the contents of a base address register (not shown) of SSP 130 during system boot-up. This programming may be accomplished with the aid of the BIOS. BAR shadow register 515 is configured to match the BAR of SSP 130. Control logic 516 maintains the alignment between the BAR of SSP 130 and BAR shadow register 515. To maintain the alignment, in one embodiment, control logic 516 may define a dedicated initialization device select (IDSEL) for SSP 130. SSP 130 may be physically mounted or soldered to the motherboard. The motherboard may be configured to wire SSP 130 with the predefined and dedicated IDSEL from PCI bus bridge 421 of I/O interface 520. To map the 40-bit security addresses into corresponding 32-bit address space of PCI bus 545, address mapper 515 may be configured to notify control logic 516 when an enumeration write is occurring. Control logic 516 may snarf enumeration writes directed to the BAR of SSP 130 and to cause the snarfed enumeration writes to be written instead to the into BAR shadow register 515. Snarfing refers to monitoring a bus or interface for specific transactions and if a match is found, removing or intercepting the transaction.

In one embodiment, the SL validation and memory mapped I/O transactions are mapped by address mapper 511 of PCI bus bridge 421 into the address range on PCI bus 545 as follows:

| | |
|---|---|
| XXXX_XXX0h-XXXX_XXX3h | Hash_End |
| XXXX_XXX4h-XXXX_XXX7h | Hash_Data |
| XXXX_XXX8h-XXXX_XXXBh | Hash_Start |
| XXXX_X00Ch-XXXX_X1FFh | Reserved |
| XXXX_X200h-XXXX_XFFFh | SSP Memory-Mapped I/O Window |

In the illustrated embodiment, internal bus 521 may be used to convey transactions internally within PCI bus bridge 421. Transactions received upon NC I/O link 225 may be received by internal bridge unit 501 and translated to internal bus cycles. In one embodiment, internal bridge unit 501 may be configured to receive HyperTransport™ messages upon NC I/O link 225 and to translate those messages into PCI bus cycles for conveyance upon internal bus 521. For example, HyperTransport™ messages such as Hash_Start, Hash_End and Hash_Data messages as described below in conjunction with the descriptions of FIG. 6 through FIG. 8 may be sent.

As internal bridge unit 501 receives transactions from NC I/O link 225, SKINIT filter 515 may be configured to recognize SKINIT transactions. If the transactions are SKINIT transactions they may be forwarded to SKINIT source detector 550. Address mapper 511 may map the 40-bit security addresses into corresponding 32-bit address space of PCI bus 545 as shown below. Address filter 510 may receive the PCI transactions corresponding to the HyperTransport™ messages and if the addresses of the transactions are within the 256-byte security initialization address window of SSP 130 (e.g., the first three Dwords of the memory mapped I/O space corresponding to the Hash_Start, Hash_End and Hash_Data addresses), an in-range signal may be provided by address filter 510 to SKINIT source detector 550.

SKINIT source detect 550 may be configured to determine the source of the transactions. If SKINIT source detect 550 determines that the source of the SKINIT transactions is not the host bridge, the SKINIT transactions may be dropped or discarded. In one embodiment, a system reset may be initiated in response to receiving SKINIT transactions in which the host bridge is not the only source. In alternative embodiments, PCI bus bridge 421 may block issuance of subsequent grants to the master that attempted the access to the security initialization address window of SSP 130.

However, if SKINIT source detect 550 determines that the source of the SKINIT transactions is the host bridge of SEM processor 100A and that the addresses of the transactions are within the security initialization window, as determined by the in-range signal, then the SKINIT transactions are allowed to be translated into PCI commands by Hash_x command translator 555 and mapped into the associated PCI addresses. PCI bus cycle engine 535 may then generate the appropriate PCI bus cycles. PCI bus driver 540 may then generate the appropriate signals to drive the bus cycles onto PCI bus 545 for conveyance to SSP 130.

Read buffer 525 and write buffer 530 may be storages configured to store data associated with each internal bus cycle. As transactions are conveyed upon internal bus 521, internal bus cycle decoder 520 may determine whether the transaction is a read cycle or a write cycle. Any data associated with the cycle may be stored in the appropriate buffer for use by PCI bus cycle engine 535 when generating PCI bus cycles.

Accordingly, as described above, PCI bus bridge 421 may allow accesses to the security initialization address window of SSP 130 which originate from the host bridge of SEM-capable processor 100 and block other accesses such as peer-to-peer accesses during a security initialization of SEM-capable processor 100.

Although the embodiment of PCI bus bridge 421 described above in conjunction with the description of FIG. 5 includes functionality associated with specific blocks, it is noted that the specific blocks used are for discussion purposes only and that other embodiments are contemplated which may include other blocks configured to perform similar functions.

Security Kernel Initialization using HyperTransport™ Transactions

Figure 6:
FIG. 6 is a drawing depicting one embodiment of a Hash_Start packet formatted in the HyperTransport™ protocol.
Figure 7:
FIG. 7 is a drawing depicting one embodiment of a Hash_End packet formatted in the HyperTransport™ protocol.

As described above, packets may be sent upstream or downstream upon a HyperTransport™ link such as NC I/O link 225. Further some packets may have a particular destination and others may be broadcast to all devices. FIG. 6 through FIG. 8 illustrate exemplary SKINIT transaction packets compatible with the HyperTransport™ specification. FIG. 6 illustrates an exemplary Hash_Start packet, while FIG. 7 illustrates an exemplary Hash_End packet and FIG. 8 illustrates an exemplary Hash_Data packet. More detailed information regarding the link configuration and signaling as well as the various HyperTransport™ packet formats may be found in the latest revision of the HyperTransport™ I/O Link Specification, published by the HyperTransport™ Technology Consortium.

Turning now to FIG. 6, a drawing depicting one embodiment of a Hash_Start packet is shown. Hash_Start packet 600 includes multiple fields made up of bits 0-7, or one byte. Additionally, the packet includes bit times 0-7, and thus is an 8-byte packet. The format of Hash_Start packet 600 identifies it as a broadcast message which is generally used by the host bridge to communicate to all downstream devices. During bit time zero, bits 0-5 are used to encode the type of command and labeled CMD[5:0], while bits 6-7 are used to encode bits 2 and 3 of the sequence ID and are labeled SeqID[3:2]. In the illustrated embodiment, the encoding of CMD[5:0] is 111010b, which is indicative of a non-posted, sized-write, double word, isochronous, non-coherent packet. During bit time 1, bits 0-4 are used to encode the Unit ID of the host bridge (00000b) and it is labeled UnitID[4:0]. Bits 5-6 are used to encode bits 0 and 1 of the sequence ID and are labeled SeqID[1:0]. Bit 7 is a pass posted writes bit and is labeled PassPW. In this embodiment, the PassPW bit is fixed to a value of 0b. During bit time 2, all bits are reserved. During bit time 3, bits 0-1 are reserved. Bits 2-7 are used to encode the address bits 2 through 7 and they are labeled Addr[7:2]. These bits are don't care bits. During bit time 4, bits 0-7 are used to encode the address bits 8 through 15 and they are labeled Addr[15:8]. These bits are don't care bits. During bit time 5, bits 0-1 are used to encode the address bits 16 and 17 and they are labeled Addr [17:16]. These bits are don't care bits. Bits 2-7 are used to encode the address bits 18 through 23 and they are labeled Addr [23:18]. These bits are encoded with an address value of 001010b. During bit time 6, bits 0-7 are used to encode the address bits 24 through 31 and they are labeled Addr [31:24]. These bits are encoded with an address value of F9h. During bit time 7, bits 0-7 are used to encode the address bits 32 through 39 and they are labeled Addr [39:32]. These bits are encoded with an address value of FDh. These addresses correspond to the reserved SKINIT address space of SSP 130 described in conjunction with the descriptions of FIG. 2 through FIG. 5 above.

Referring to FIG. 7, a drawing of one embodiment of a Hash_End packet is shown. Similar to Hash_Start Packet 600 of FIG. 6, Hash_End packet 700 includes multiple fields made up of bits 0-7, or one byte. Additionally, the packet includes bit times 0-7, and thus is an 8-byte packet. The format of Hash_End packet 700 identifies it as a broadcast message which is generally used by the host bridge to communicate to all downstream devices. During bit time zero, bits 0-5 are used to encode the type of command and labeled CMD[5:0], while bits 6-7 are used to encode bits 2 and 3 of the sequence ID and are labeled SeqID[3:2]. In the illustrated embodiment, the encoding of CMD[5:0] is 111101b, which is indicative of a non-posted, sized-write, double word, non-coherent packet. During bit time 1, bits 0-4 are used to encode the Unit ID of the host bridge (00000b) and it is labeled UnitID[4:0]. Bits 5-6 are used to encode bits 0 and 1 of the sequence ID and are labeled SeqID[1:0]. Bit 7 is a pass posted writes bit and is labeled PassPW. In this embodiment, the PassPW bit is fixed to a value of 0b. During bit time 2, all bits are reserved. During bit time 3, bits 0-1 are reserved. Bits 2-7 are used to encode the address bits 2 through 7 and they are labeled Addr [7:2]. These bits are encoded to an address value of 00000b. During bit time 4, bits 0-7 are used to encode the address bits 8 through 15 and they are labeled Addr [15:8]. These bits are encoded to an address value of 00000b. During bit time 5, bits 0-7 are used to encode the address bits 16 through 23 and they are labeled Addr [23:16]. These bits are encoded with an address value of 28h. During bit time 6, bits 0-7 are used to encode the address bits 24 through 31 and they are labeled Addr [31:24]. These bits are encoded with an address value of F9h. During bit time 7, bits 0-7 are used to encode the address bits 32 through 39 and they are labeled Addr[39:32]. These bits are encoded with an address value of FDh. These addresses correspond to the reserved SKINIT address space of SSP 130 described in conjunction with the descriptions of FIG. 2 through FIG. 5 above.

Turning to FIG. 8, a drawing of one embodiment of a Hash_Data packet is shown. Hash_Data packet 800 includes multiple fields made up of bits 0-7, or one byte. Additionally, the packet includes bit times 0-7, and thus is an 8-byte packet. The format of Hash_Data packet 800 identifies it as a sized write request packet. During bit time zero, bits 0-5 are used to encode the type of command and labeled CMD[5:0], while bits 6-7 are used to encode bits 2 and 3 of the sequence ID and are labeled SeqID[3:2]. In the illustrated embodiment, the encoding of CMD[5:0] is 0011x0b, which is indicative of a non-posted, sized-write request having double word data, non-coherent packet. During bit time 1, bits 0-4 are used to encode the Unit ID of the host bridge (00000b) and it is labeled UnitID[4:0]. Bits 5-6 are used to encode bits 0 and 1 of the sequence ID and are labeled SeqID[1:0]. Bit 7 is a pass posted writes bit and is labeled PassPW. In this embodiment, the PassPW bit is fixed to a value of 0b. During bit time 2, Bits 0-4 are used to encode a source tag value and are labeled SrcTag[4:0]. Bit 5 is used as a compatibility bit and is fixed to a value of 0b. Bits 6-7 are used to encode bits 0 and 1 of a data mask or data count value and are labeled Mask/Count[1:0]. These bits are encoded with a value 0xb indicating that Hash_ Data may be sent as a single Dword per transaction and either Byte or Dword mode may be used. For example, for Dword mode the count=0000b (1 Dword) and for byte mode the count=0001b (2 Dwords, one data, one mask), and the mask Dword=000Fh. During bit time 3, bits 0-1 used to encode bits 2 and 3 of a data mask or data count value and are labeled Mask/Count[3:2]. Bits 2-7 are used to encode the address bits 2 through 7 and they are labeled Addr[7:2]. These bits are encoded with an address value of 000001b. During bit time 4, bits 0-7 are used to encode the address bits 8 through 15 and they are labeled Addr [15:8]. These bits are encoded with an address value of 00h. During bit time 5, bits 0-7 are used to encode the address bits 16 through 23 and they are labeled Addr [23:16]. These bits are encoded with an address value of 28h. During bit time 6, bits 0-7 are used to encode the address bits 24 through 31 and they are labeled Addr[31:24]. These bits are encoded with an address value of F9h. During bit time 7, bits 0-7 are used to encode the address bits 32 through 39 and they are labeled Addr[39:32]. These bits are encoded with an address value of FDh. These addresses correspond to the reserved SKINIT address space of SSP 130 described in conjunction with the descriptions of FIG. 2 through FIG. 5 above.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:
1. A computer system comprising:
  a processor configured to initialize a secure execution mode by executing a security initialization instruction and to operate in said secure execution mode by executing a secure operating system code segment;
  an input/output (I/O) interface coupled to said processor via an I/O link, wherein said I/O interface is configured to receive transactions performed as a result of said execution of said security initialization instruction and to determine whether said processor is a source of said transactions, wherein said transactions include at least a portion of said secure operating system code segment; and
  a security services processor coupled to said I/O interface via a peripheral bust, wherein said security services processor is separate from the processor and configured to verify whether said at least a portion of said secure operating system code segment is valid during said initialization of said processor into said secure execution mode;

wherein said I/O interface is configured to convey said transactions to said security services processor dependent upon determining that said processor is said source of said transactions.

2. The computer system as recited in claim 1, wherein said I/O interface is configured to block said transactions to said security services processor in response to determining that said processor is not the only source of said transactions.

3. The computer system as recited in claim 1, wherein said transactions performed as a result of said execution of said security initialization instruction include a Start transaction, a corresponding Data transaction and a corresponding End transaction.

4. The computer system as recited in claim 3, wherein said I/O interface is further configured to block all peer-to peer transactions on said peripheral bus after receiving said Start transaction and before receiving said corresponding End transaction.

5. The computer system as recited in claim 3, wherein said I/O interface is further configured to block all peer-to-peer transactions to said security services processor after receiving said Start transaction and before receiving said End transaction.

6. The computer system as recited in claim 3, wherein said I/O interface is further configured to force a system reset in response to detecting accesses to an address space of said security services processor associated with said Start transaction, said Data transaction and said End transaction which do not originate from said processor.

7. The computer system as recited in claim 3, wherein said I/O link is a point-to-point packet-based link including a pair of unidirectional wires, wherein each wire conveys packets in a different direction.

8. The computer system as recited in claim 3, wherein each of said Start transaction, said Data transaction and said End transaction are packets, wherein each packet includes eight, eight-bit portions, each portion being transferred during a respective bit time, wherein a subset of the eight-bit portions includes multiple fields, and wherein one of the multiple fields includes a unit identifier encoding that identifies the source of the packet.

9. The computer system as recited in claim 8, wherein said Start transaction is a broadcast message and includes addresses in the range including FD_F920_0000h through FD_FFFFh.

10. The computer system as recited in claim 9, wherein an address specified in said Start transaction address range includes sixteen low order bits which form a portion of a base address of a secure loader portion of said secure operating system code segment.

11. The computer system as recited in claim 8, wherein said End transaction is a broadcast message and includes addresses in the range including FD_F928_0000h through FD_F928_0003h.

12. The computer system as recited in claim 8, wherein said Data transaction is a sized write request and includes addresses in the range including FD_F928_0004h through FD_F928_0007h.

13. The computer system as recited in claim 8, wherein said security initialization instruction is a secure kernel initialization instruction (SKINIT), wherein the SKINT instruction comprises a single instruction including a plurality of atomically executed microcode components.

14. A method of initializing a processor to operate in a secure execution mode, whereby said processor operates in said secure execution mode by executing a secure operating system code segment, said method comprising:

said processor executing a security initialization instruction;

an I/O interface receiving transactions performed as a result of said execution of said security initialization instruction from said processor on an I/O link, wherein said transactions include at least a portion of said secure operating system code segment;

said I/O interface determining whether said processor is a source of said transactions; and said I/O interface conveying said transactions to a security services processor that is separate from said processor, dependent upon determining that said processor is said source of said transactions;

said security services processor verifying whether said at least a portion of said secure operating system code segment is valid during said initialization of said processor into said secure execution mode.

15. The method as recited in claim 14, further comprising said I/O interface blocking said transactions to said security services processor in response to determining that said processor is not the only source of said transactions.

16. The method as recited in claim 14, wherein said transactions performed as a result of said execution of said security initialization instruction include a Start transaction, a corresponding Data transaction and a corresponding End transaction.

17. The method as recited in claim 16 further comprising said I/O interface blocking all peer-to peer transactions on said peripheral bus after receiving said Start transaction and before receiving said corresponding End transaction.

18. The method as recited in claim 16 further comprising said I/O interface blocking all peer-to-peer transactions to said security services processor after receiving said Start transaction and before receiving said End transaction.

19. The method as recited in claim 16, wherein said I/O link is a point-to-point packet-based link including a pair of unidirectional wires, wherein each wire conveys packets in a different direction.

20. The method as recited in claim 16, wherein each of said Start transaction, said Data transaction and said End transaction are packets, wherein each packet includes eight, eight-bit portions, each portion being transferred during a respective bit time, wherein a subset of the eight-bit portions includes multiple fields, and wherein one of the multiple fields includes a unit identifier encoding that identifies the source of the packet.

21. The method as recited in claim 20, wherein said Start transaction is a broadcast message and includes addresses in the range including FD_F920_0000h through FD_F923_FFFFh.

22. The method as recited in claim 21, wherein an address specified in said Start transaction address range includes sixteen low order bits which form a portion of a base address of a secure loader portion of said secure operating system code segment.

23. The method as recited in claim 20, wherein said End transaction is a broadcast message and includes addresses in the range including FD_F928_0000h through FD_F928_0003h.

24. The method as recited in claim 20, wherein said Data transaction is a sized write request and includes addresses in the range including FD_F928_0004h through FD_F928_0007h.

* * * * *

UNITED STATES PATENT AND TRADEMARK OFFICE
CERTIFICATE OF CORRECTION

| | |
|---|---|
| PATENT NO. | : 7,603,550 B2 |
| APPLICATION NO. | : 10/419082 |
| DATED | : October 13, 2009 |
| INVENTOR(S) | : Kevin J. McGrath et al. |

It is certified that error appears in the above-identified patent and that said Letters Patent is hereby corrected as shown below:

Claim 1, col. 18, line 62, please change "bust" to "bus".

Claim 9, col. 19, line 45, please change "FD_FFFFh" to "FD_F923_FFFFh".

Signed and Sealed this

First Day of December, 2009

David J. Kappos
*Director of the United States Patent and Trademark Office*

UNITED STATES PATENT AND TRADEMARK OFFICE
CERTIFICATE OF CORRECTION

PATENT NO.       : 7,603,550 B2                                          Page 1 of 1
APPLICATION NO. : 10/419082
DATED            : October 13, 2009
INVENTOR(S)      : McGrath et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1804 days.

Signed and Sealed this

Fifth Day of October, 2010

David J. Kappos
*Director of the United States Patent and Trademark Office*